Figure 1:
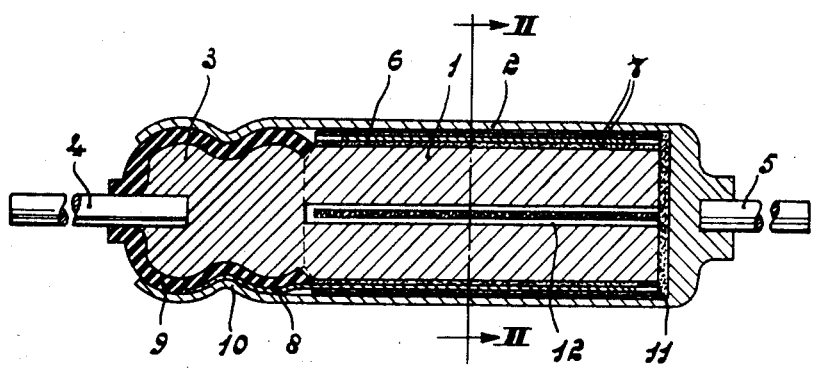

May 5, 1959  R. D. BÜGEL  2,885,607
MINIATURE ELECTROLYTIC CAPACITORS
Filed July 20, 1954

ROEL OF DIRK BÜGEL
INVENTOR.

BY *Fred M. Vogel*
AGENT

United States Patent Office 2,885,607
Patented May 5, 1959

2,885,607

MINIATURE ELECTROLYTIC CAPACITORS

Roelof Dirk Bügel, Eindhoven, Netherlands, assignor, by mesne assignments, to North American Philips Company, Inc., New York, N.Y., a corporation of Delaware Application July 20, 1954, Serial No. 444,561

Claims priority, application Netherlands July 20, 1953

5 Claims. (Cl. 317—230)

The present invention relates to a miniature electrolytic capacitor.

Because of the continuously increasing use of electric and electronic equipment, particularly in cases in which this equipment must be readily portable, or is required for different reasons to occupy minimum space and have minimum weight, considerable effort in being made to manufacture the electric parts of this equipment so that they will be of minimum size and minimum weight. The apparatus in which such miniature parts are of advantage includes hearing aids, walkie-talkies and radio sondes.

The invention relates to a miniature electrolytic capacitor and has for its object to provide a construction which due to its small size is highly suited to replace the paper capacitors of considerably larger size which hitherto have been used for certain purposes.

According to the invention a miniature electrolytic capacitor contains a rod-shaped electrode provided with a dielectric oxide film and arranged centrally of a tube closed at one end. Wound on this electrode with the interposition of an electrolyte-impregnated spacing foil is a metal foil which acts as a second electrode and is electrically connected to the tube. The open end of the tube is closed by a collar of resilient, insulating material, such as rubber, which is applied to the end of the rod-shaped electrode.

Due to its small volume the capacitor according to the invention contains only a slight amount of electrolyte, so that a slight degree of drying-out may considerably affect the electrical properties of the capacitor. Consequently the rod-shaped electrode preferably has one or more recesses formed in it which may serve as a reservoir for the electrolyte. The rod-shaped electrode may have a bore formed in it, for example, at the end enclosed in the enveloping tube, but preferably this part of the rod-shaped electrode is provided with an actual saw-cut which may also serve to secure one end of the spacing foil wound on the rod.

In a preferred embodiment of the miniature capacitor according to the invention the active surface of that part of the rod-shaped electrode which is enclosed in the tube is enlarged in a known manner, for example, by chemical or electrochemical means. In this case it is preferable to use as the other electrode a foil at least the surface of which adjacent the rod-shaped electrode is also enlarged, thus permitting the capacitor to carry a heavier alternating current without a resultant undue reduction of the capacitance.

The miniature electrolytic capacitor according to the invention is highly suited for coupling in transistor circuit arrangements, in which it is capable of replacing the paper capacitors hitherto used for this purpose. In this manner a comparatively large gain in space is obtained, because the capacity-volume ratio of the capacitor according to the invention exceeds by a factor of more than 20 the corresponding ratio in paper capacitors used for the same purpose.

Figure 2:
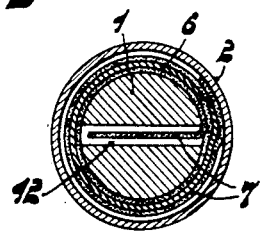

In order that the invention may be readily carried into effect, it will now be described with reference to the accompanying drawing, in which Fig. 1 is a longitudinal cross-sectional view of an embodiment of the capacitor of the present invention; and Fig. 2 is a transverse cross-sectional view of the embodiment of Fig. 1, taken along the line II—II of Fig. 1.

The polarized capacitor of Figs. 1 and 2 comprises a round core 1 made of aluminum which forms the anode and is arranged centrally in an aluminum tube 2 open at one end. An end 3 of the core 1 arranged in the tube aperture has a connecting lead 4 welded to it while a second connecting lead 5 is secured to the outside of the closed end of the tube 2. The cathode of the capacitor consists of an aluminum foil 6 which is wound on the core 1 at least once with the interposition of a spacing foil 7, for instance of absorbing paper impregnated with a suitable electrolyte. The spacing foil 7 can extend beyond the cathode foil 6 which forms a single turn with the result that the foil 7 is also interposed between the wall of the tube 2 and the cathode foil 6.

The cathode foil 6 comprises a lip 8, which is electrically connected to the tube 2. This connection is established by clamping the lip 8 between the inner wall of the tube 2 and a collar of resilient material, for instance rubber, which is pressed over the end 3 of core 1. Collar 9 forms an insulating seal between the end portion of the tube 2 and the projecting end of the anode 1. Due to the fact that the core and the tube have a depression formed in them at the same place (10) the collar 9 at this point is strongly compressed so that a complete seal is obtained and at the same time the lip 8 makes satisfactory electrical contact with the tube 2.

On the base of the tube 2 an insulating disc 11 is arranged which prevents a short-circuit between the core 1 and the tube 2. The disc 11 is made of the same material as the spacing foil 7 and is similarly thereto impregnated with electrolyte.

The anode core 1 has a longitudinal saw-cut 12 formed in it in which one end of the spacing foil 7 is inserted, which assists in jointly winding foils 6 and 7 during manufacture. Saw-cut also acts as a reservoir for the electrolyte since due to the small size of the capacitor only a small supply thereof is absorbed in the spacing foil 7 and the disc 11.

By an etching process the active surface of the core 1 is enlarged in known manner and also has a dielectric film formed on it in a known manner.

The cathode foil 6 is etched also, but only on the surface adjacent the core 1. Due to the one-sided etching, the foil 6 is not excessively weakened mechanically while the enlarged active surface assists in preventing a dielectric film from being produced on the cathode after a time, which film would reduce the capacitance of the capacitor.

In the embodiment described with a capacitance of approximately 0.1 microfarad and an operating voltage of approximately 30 volts, the length of the capacitor unit is approximately 10 mms and the outer diameter is approximately 3.2 mms.

What is claimed is:

1. A miniature electrolytic capacitor comprising an aluminum tubular body closed at one end and having a rolled-in portion at the other end, a rod-shaped first electrode constituted of aluminum arranged centrally in said tubular body, said first electrode having a peripheral groove thereon corresponding to the rolled-in portion of said tubular body, an insulating electrolyte-impregnated spacing foil interposed between said first electrode and said tubular body, said spacing foil being wound about said first electrode, a collar of substantially resilient insulating material enclosing one end of said first electrode, a part of said collar being disposed in said groove, a second electrode constituted of a metal foil wound about said spacing foil and insulated from said tubular body, a connecting strip electrically connecting said second electrode to said tubular body, a part of said connecting strip abutting the conforming rolled-in portion of the tubular body wall by said collar.

2. A miniature electrolytic capacitor comprising an aluminum tubular body closed at one end and having a rolled-in portion at the other end, a rod-shaped first electrode constituted of aluminum arranged centrally in said tubular body, an insulating electrolyte-impregnated spacing foil interposed between said first electrode and said tubular body, said spacing foil being wound about said first electrode, a collar of substantially resilient insulating material enclosing one end of said first electrode, a part of said collar being clamped in said rolled-in portion, a second electrode constituted of a metal foil wound about said spacing foil and insulated from said tubular body, and means electrically connecting said second electrode to said tubular body.

3. A miniature electrolytic capacitor comprising an aluminum tubular body closed at one end and having a rolled-in portion at the other end, a rod-shaped first electrode constituted of aluminum arranged centrally in said tubular body, said first electrode having a longitudinal slot therein, an insulating electrolyte-impregnated spacing foil interposed between said first electrode and said tubular body, said spacing foil being wound about said first electrode, one end of said spacing foil being inserted in said slot, a collar of substantially resilient insulating material enclosing one end of said first electrode, a part of said collar being clamped in said rolled-in portion, a second electrode constituted of a metal foil wound about said spacing foil and insulated from said tubular body, and means electrically connecting said second electrode to said tubular body.

4. A miniature electrolytic capacitor comprising an aluminum tubular body closed at one end and having a rolled-in portion at the other end, a rod shaped first electrode constituted of aluminum arranged centrally in said tubular body, said first electrode having a longitudinal slot therein, said slot being filled with an electrolyte, an insulating electrolyte-impregnated spacing foil interposed between said first electrode and said tubular body, said spacing foil being wound about said first electrode, one end of said spacing foil being inserted in said slot, a collar of substantially resilient insulating material enclosing one end of said first electrode, a part of said collar being clamped in said rolled-in portion, a second electrode constituted of a metal foil wound about said spacing foil and insulated from said tubular body, and means electrically connecting said second electrode to said tubular body.

5. A miniature electrolytic capacitor comprising an aluminum tubular body closed at one end and having a rolled-in portion at the other end, a rod-shaped first electrode constituted of aluminum arranged centrally in said tubular body, said first electrode having a peripheral groove thereon corresponding to the rolled-in portion of said tubular body, said first electrode having a longitudinal slot therein, an insulating electrolyte-impregnated spacing foil interposed between said first electrode and said tubular body, said spacing foil being wound about said first electrode, one end of said spacing foil being inserted in said slot, a collar of substantially resilient insulating material enclosing one end of said first electrode, a part of said collar being disposed in said groove, a second electrode constituted of a metal foil wound about said spacing foil and insulated from said tubular body, a connecting strip electrically connecting said second electrode to said tubular body, a part of said connecting strip abutting the conforming rolled-in portion of the tubular body by said collar.

References Cited in the file of this patent
UNITED STATES PATENTS

| | | |
|---|---|---|
| 793,647 | Fessenden | July 4, 1905 |
| 1,597,835 | Shrader | Aug. 31, 1926 |
| 2,066,912 | Ruben | Jan. 5, 1937 |
| 2,758,258 | Bliss | Aug. 7, 1956 |

FOREIGN PATENTS

| | | |
|---|---|---|
| 503,460 | Great Britain | Apr. 6, 1939 |